Dec. 21, 1926.  
A. P. SMITH ET AL  
1,611,248  
AUTOMOBILE BODY  
Filed April 12, 1926
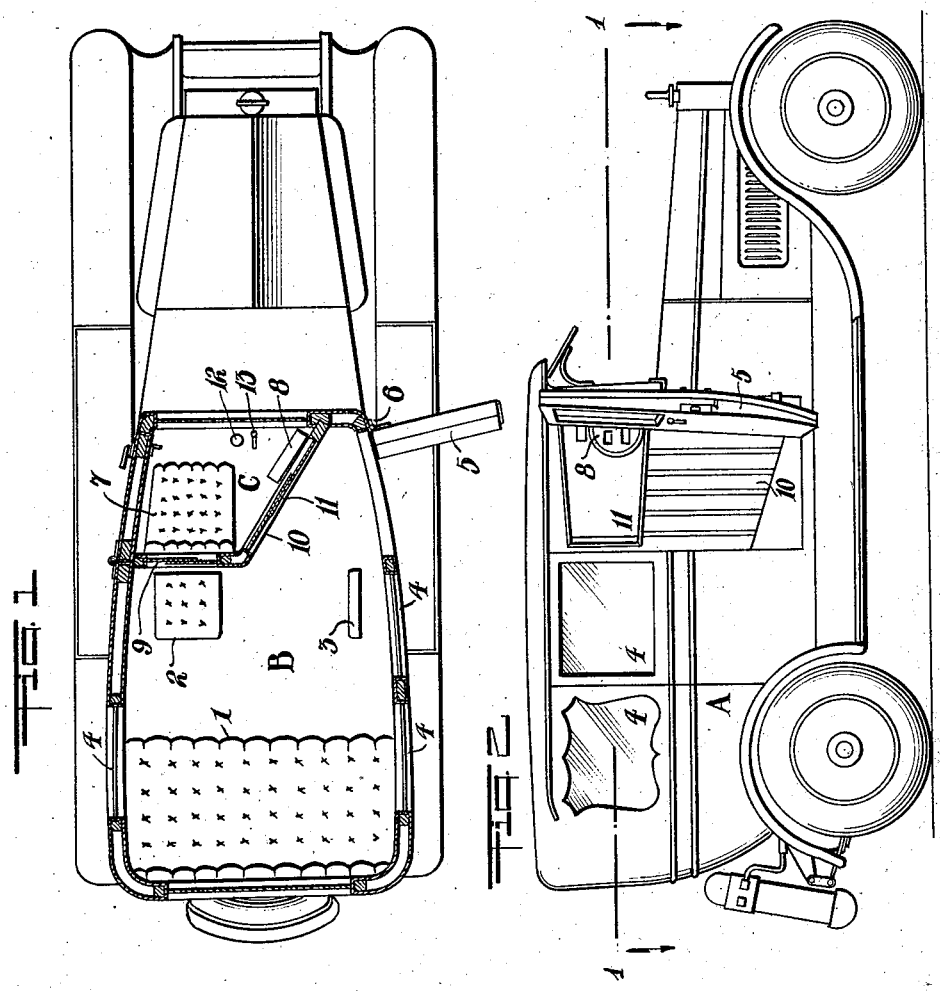
INVENTOR  
Arthur P. Smith  
and Samuel Eichel  
BY  
ATTORNEY Patented Dec. 21, 1926.

1,611,248

UNITED STATES PATENT OFFICE.

ARTHUR P. SMITH AND SAMUEL EICHEL, OF NEW YORK, N. Y., ASSIGNORS TO HARVARD AUTO BODY COMPANY, A CORPORATION OF NEW YORK.

AUTOMOBILE BODY.

Application filed April 12, 1926. Serial No. 101,282.

The object of this invention is to provide a taxicab body which will have all of the advantages of the usual structures of that class, but which shall have the exterior appearance of a private car, the construction being such that the passengers must leave and enter the cab from a point directly opposite the driver's seat. The driver is enclosed and protected and yet the entrance space is so arranged as to enable an extra passenger to be comfortably seated facing forwardly, or to provide adequate space for hand luggage, etc.

The invention will be understood by reference to the accompanying drawing in which—

Figure 1 is a plan view of an embodiment of the invention, the body having been cut away on the line 1—1, Figure 2, and Figure 2 is a side elevation of the cab constructed in accordance with the invention, the entrance door being open.

The body A may be mounted upon any suitable chassis. The main compartment B is provided with a rear seat 1, an auxiliary seat 2 facing rearwardly, and a second auxiliary seat 3 which is preferably hinged so that it may move upwardly and out of the way when not in use, as indicated in Figure 1. The body is provided with suitable windows 4 and is provided with a forward entrance door 5 hinged at 6. The door may be hinged to open toward the front, or rearwardly as desired.

The driver's compartment is indicated at C. In it is provided a seat 7, the controls and the usual taxi meter 8, etc. The wall back of the driver's seat is provided with a window 9 which may be arranged for opening and closing so that the driver may communicate with the passengers. The wall back of the driver's seat extends at right angles to the body. Beginning at a point to the right of the driver's seat is a forwardly extending angular wall 10 which preferably is made a rigid part of the body structure and is provided with a window or windows 11.

Wall 10 provides a triangular space to the right of the driver's seat for operation of the gear shift lever 12, and the brake 13, and for access to the meter 8. If desired a suitable lever arrangement connected to the door 5 may have its operating handle within the driver's compartment so that the driver may readily open and close the door 5. Such devices are old in the art and do not form any part of the present invention.

As the passengers enter the cab they pass directly opposite the side of the driver. Assuming that window 11 is open they can readily give their directions before entering the cab. Upon entering the cab a passenger may deposit his hand luggage in the triangular space to the right of the driver's compartment, or if several passengers are to be carried the said space may be left clear so that a passenger occupying the seat 3 may face forward comfortably. The passengers cannot leave without the driver's attention being called thereto, not only visually, inasmuch as they must move to a point directly opposite to the driver, but because the exit door is also at the side of the driver and the sound of its opening would be heard by the driver. It will further be noted that these advantages are obtained without changing the exterior appearance of the body from that usually employed in private cars.

Having described our invention what we claim and desire to secure by Letters Patent is as follows, it being understood that various modifications may be made in the embodiment shown in the drawings without departing from the spirit of the invention.

1. A taxicab body having a top and windows in the sides of the body, a rear seat and an entrance door in the front of the body at the curb side thereof, a driver's compartment separated from the main body space of the cab, said compartment having a rear transverse wall, a driver's seat in front of said wall, and a forwardly inclined wall beginning at a point laterally of the seat and terminating in the front of the body near the entrance door.

2. In a taxicab body, a main compartment having a rear seat, an auxiliary front seat and a driver's compartment, the driver's compartment being separated from the main compartment by a transversely extending wall, and a wall extending in an angle therefrom and terminating in the front wall of the body, and an entrance door opposite said forwardly extending wall.

3. A taxicab body having two compartments, a main compartment and a driver's compartment, the two compartments being separated by a transverse wall extending part way across the body and a forwardly inclined wall extending from the first named wall to the front of the body, an entrance door opposite said last named wall, and a passageway intermediate the door and said wall and leading to the main compartment.

In testimony whereof, we have signed our names to this specification.

ARTHUR P. SMITH.
SAMUEL EICHEL.